US008259582B2

(12) United States Patent
Friedman et al.

(10) Patent No.: US 8,259,582 B2
(45) Date of Patent: Sep. 4, 2012

(54) METHOD AND APPARATUS TO MANAGE PER FLOW STATE

(75) Inventors: Ben-Zion Friedman, Jerusalem (IL); Eliel Louzoun, Ramot B. Jerusalem (IL); Eliezer Tamir, Beit Shemesh (IL); Vladislav Kopzon, Haifa (IL)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 12/590,724

(22) Filed: Nov. 13, 2009

(65) Prior Publication Data

US 2011/0116375 A1  May 19, 2011

(51) Int. Cl.
*H04L 12/12* (2006.01)
(52) U.S. Cl. ....................................... 370/235
(58) Field of Classification Search .................. 370/235, 370/389, 392; 709/204–207; 712/201, 225
See application file for complete search history.

(56) References Cited

U.S. PATENT DOCUMENTS

| | | | | |
|---|---|---|---|---|
| 7,203,195 B2* | 4/2007 | Hidaka et al. | ........ | 370/392 |
| 7,231,470 B2* | 6/2007 | Huggahalli et al. | ........ | 710/33 |
| 7,237,031 B2* | 6/2007 | Cheng | ........ | 709/230 |
| 7,376,755 B2* | 5/2008 | Pandya | ........ | 709/250 |
| 7,606,160 B2* | 10/2009 | Klinker et al. | ........ | 370/238 |
| 7,624,263 B1* | 11/2009 | Viswanath et al. | ........ | 713/151 |
| 7,894,440 B2* | 2/2011 | Xu et al. | ........ | 370/392 |
| 2005/0132102 A1* | 6/2005 | Huggahalli et al. | ........ | 710/36 |
| 2006/0112227 A1* | 5/2006 | Hady et al. | ........ | 711/130 |
| 2006/0153215 A1* | 7/2006 | Cornett et al. | ........ | 370/412 |
| 2008/0253395 A1* | 10/2008 | Pandya | ........ | 370/469 |
| 2009/0073977 A1* | 3/2009 | Hussain et al. | ........ | 370/389 |
| 2009/0089505 A1 | 4/2009 | Vasudevan | | |

OTHER PUBLICATIONS

Jacobson, Van. "TCP Extensions for High Performance." Internet Engineering Task Force (IETF) Request for Comments (RFC) 1323. http://tools.ietf.org/html/rfc1323. May 1992. 37 pages.

\* cited by examiner

*Primary Examiner* — Ricky Ngo
*Assistant Examiner* — Ben H Liu (57) ABSTRACT

A method and apparatus to reduce memory required in a network interface controller to store per flow state information associated with a network connection is provided. Instead of storing per flow state information for a connection in the network interface controller at an endpoint of the connection, the per flow state information for the connection is stored in memory external to the network interface controller. The stored state information is conveyed in a packet by the network interface controller between the endpoints of the connection. For a Transmission Control Protocol (TCP) connection, the state information is conveyed between the endpoints of the TCP connection in a TCP option included in the TCP header in the packet.

16 Claims, 7 Drawing Sheets

METHOD AND APPARATUS TO MANAGE PER FLOW STATE

FIELD

This disclosure relates to network controllers and in particular to managing per flow stae by a network controller.

BACKGROUND

A packet transmitted over a network includes data (also referred to as payload) and control information (also referred to as header(s) and trailer(s)). The control information typically includes a source address (of the transmitter of the data) and the destination address (of the receiver of the data) that are used to deliver the payload. For network protocols that are defined by the Internet Protocol Suite the control information included in the packet is defined for each of the layers.

A network interface controller (NIC) provides an interface to the network. A NIC that supports the Internet Protocol Suite manages protocols including the physical layer (PHY) protocol and the Media Access Control (MAC) layer protocol.

The Transport Control Protocol (TCP) is one of a plurality of transport layer protocols in the Internet Protocol Suite. TCP is typically used to establish a full duplex virtual connection between two endpoints by applications that require guaranteed delivery. The Internet Protocol (IP) layer is one of a plurality of data link layer protocols in the Internet Protocol suite For example, one of the applications may be a web browser and the other application may be a web server. TCP provides reliable, ordered delivery of data transported in the payload of packets between the web browser executing on one computer at one endpoint of the connection and the web server executing on another computer at the other endpoint of the connection over the network. For example, when a Hypertext Markup Language (HTML) file is sent from a web server, the TCP protocol layer in the "sender" computer divides the HTML into segments and forwards the segments to the IP layer. The IP protocol layer in the "sender" computer encapsulates each TCP segment into an IP packet. The TCP protocol layer in the "receiver" computer reassembles the segments stored in the payload of received IP packets.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Processing of the TCP layer protocol for a network packet is typically handled by a processor (Central Processor Unit (CPU) core) external to the Network Interface Controller (NIC). The NIC receives packets from the network and transmits packets to the network. The processing of the received and transmit packets is performed by the processor which may be one of a plurality of processor cores.

A packet flow or data traffic flow is a sequence of packets transmitted by a particular source to a particular destination. For example, a data traffic flow may be identified by a 5-tuple (Internet Protocol (IP) source address, IP destination address, source port address, destination port address and protocol (for example, Transmission Control Protocol (TCP)).

The data traffic flow may be a socket-to-socket communication identified by the 5-tuple. TCP is typically used to establish a full duplex virtual connection between two endpoints by applications that require guaranteed delivery which may be provided through the use of socket(s). A socket is an endpoint of a bidirectional flow across an IP-based computer network. In an embodiment, the socket is a software entity (data structure) that is instantiated at each endpoint for each TCP connection. The socket for a particular connection is identified by an Internet Protocol (IP) address and a port number and associated with another socket at the other end of the TCP connection.

In a computer system, the processing of received network packets may be distributed amongst a plurality of processors (CPU cores)) such that the processing of packets for the same data traffic flow is performed by the same processor core. The socket allows incoming data packets to be delivered to an application process or thread based on the data traffic flow associated with the data packets. The payload of the data packet is forwarded to an application based on the socket associated with the data traffic flow. For example, the Linux operating system provides socket layer functions that are used by a user process to send or receive packets. The socket layer functions provide a uniform interface between the user process and the network protocol stacks in the kernel (operating system). The socket layer functions include functions to create a socket, connect a socket to a remote socket address, bind a socket to a local socket address, send data over a socket and receive data from a socket.

The socket layer functions use a socket structure that stores information regarding the socket. An example of a socket structure is the "sock" structure in the Linux operating system that is used to store protocol specific information such as TCP/IP information including sequence numbers, Time to Live values (TTL) and Acknowledge (ACK) timeout values.

In a system that processes packets for different data traffic flows, a NIC typically stores some information per data traffic flow. Even if the state associated with a particular data traffic flow is stored in an external memory separate from the network controller, there is a need to store pointers in the NIC as to where this information is stored in the external memory.

Thus, the maximum number of data traffic flows that can be supported by the NIC is limited by the size of the memory in the NIC.

In an embodiment, instead of providing a fixed sized memory to store large tables in the NIC, a source (sender) provides information included in the packet to provide some context information needed by the NIC to process the packet, for example, the core processor used to process the flows. The provided context information is echoed in another packet transmitted to the source by the receiver of the packet. Instead of storing information per data traffic flow in memory in the NIC, the information is stored as part of a data flow context, for example, in a socket structure or a data structure associated with a Remote Direct Memory Access (RDMA) pair in a memory (which may be referred to as host memory) external to the NIC.

In contrast to having a fixed size memory in the NIC based on the maximum supported number of data traffic flows, the portion of memory external to the NIC that is used to store the per data traffic flow information is proportional to the number of active data traffic flows. In an embodiment, complex lookup schemes in the NIC to select one of the plurality of processor cores to handle a particular data traffic flow are avoided.

Figure 1:
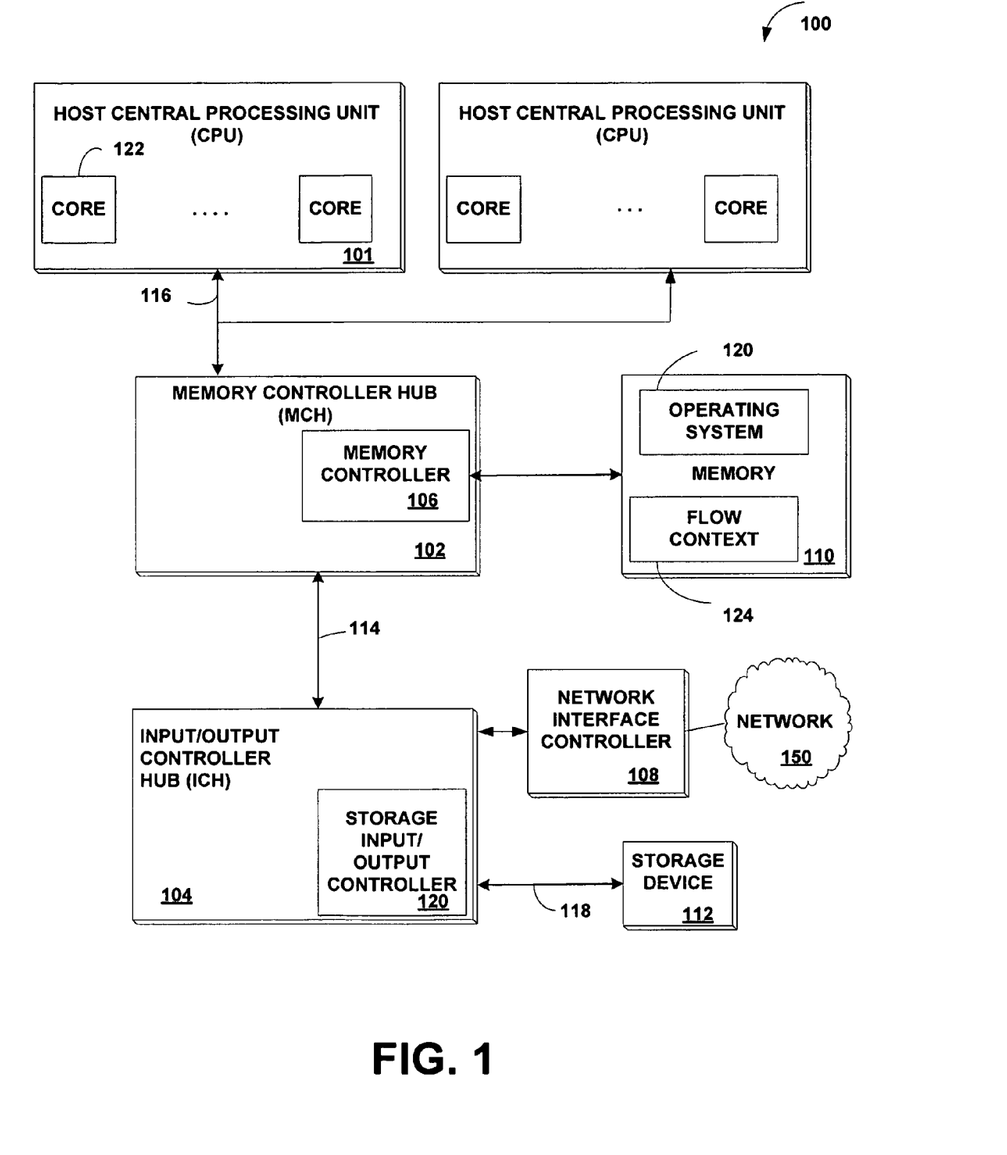
FIG. 1 is a block diagram of a system that includes an embodiment of a Network Interface Controller (NIC) that supports management of per flow state according to the principles of the present invention.

FIG. 1 is a block diagram of a system 100 that includes an embodiment of a Network Interface Controller (NIC) 108 that supports management of per flow state according to the principles of the present invention. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 110. The processor 101 and MCH 102 communicate over a system bus 116.

The processor 101 may be a multi-core processor such as Intel® Pentium D, Intel® Xeon® processor, or Intel® Core® Duo processor, Intel® Core™ i7 Processor or any other type of processor. In the embodiment shown, the system includes two multi-core processors 101 each having at least two processor cores ("cores") 122. In one embodiment, each multi-core processor 101 includes four cores 122.

The memory 110 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory. The memory 110 may store an operating system 120, for example, Microsoft's® Windows® Operating System (OS), Linux Operating System, Unix Operating System or any other type of operating system.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage Input/Output (I/O) controller 120 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

A network interface controller (NIC) 108 is coupled to the ICH 104 to provide access to the network 150. In another embodiment, the NIC 108 may be included in an ICH 104 that does not include a storage I/O controller 120 or may be included on a separate network interface card that is inserted in a system card slot in the system 100.

In an embodiment, as each network packet ("packet") is received by the network interface controller 108, the data traffic flow ("flow") associated with the network packet is determined. The "flow" of a Transport Control Protocol (TCP) packet (packet that includes a TCP header) may be determined based on the value of fields in the TCP header and the Internet Protocol (IP) header that is also included in the packet. For example, a flow identifier for the "flow" can be dependent on a combination of the IP source address and IP destination address included in the IP header and the source port address and destination port address included in the TCP header in the received network packet.

An embodiment of the present invention allows some per flow state to be stored in flow context 124 in an external memory (for example, memory 110) as part of a socket data structure, and conveyed to the other endpoint of the connection, thus removing the need to store this information in memory in the NIC 108.

Figure 2:
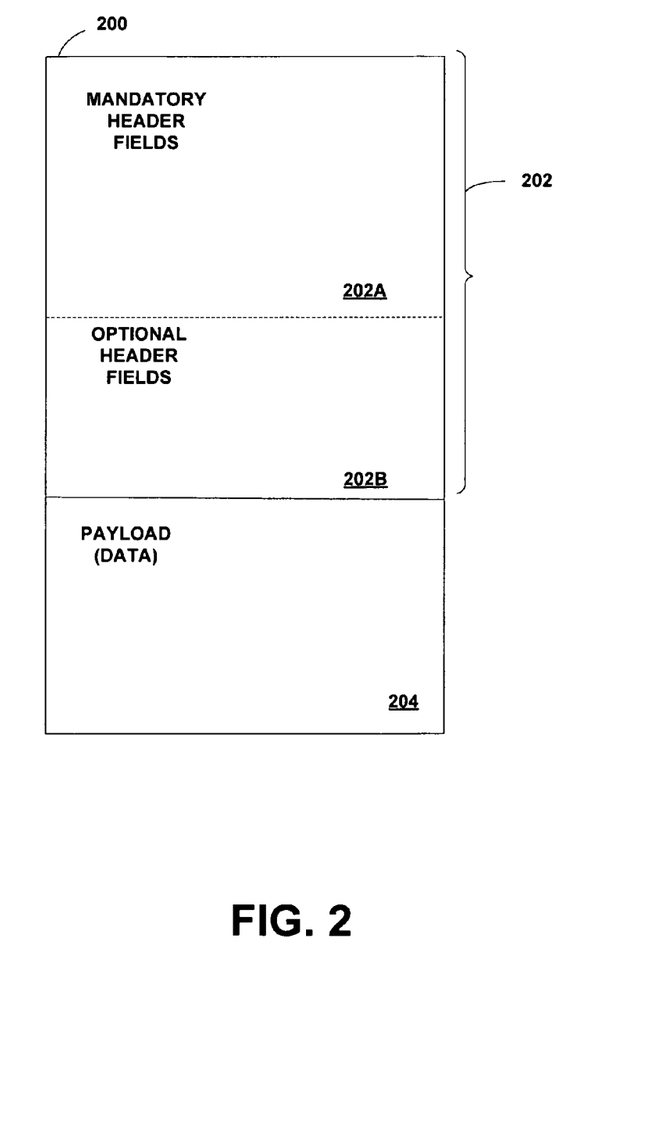
FIG. 2 is a block diagram of a Transport Control Protocol (TCP) segment that includes a TCP option.

FIG. 2 is a block diagram of a TCP segment that includes a TCP option according to the principles of the present invention.

Referring to FIG. 2, the TCP segment 200 includes a TCP header 202 and payload (data) 204. The TCP header 202 includes mandatory header fields 202A and optional header fields 20B. For example, the mandatory header fields 202A include source port address, destination port address, sequence number, acknowledgement number and checksum. The optional header fields 202B are optional extension fields also referred to as TCP options to store additional control information. For example, the optional header fields 202B can store control information that may be used to improve performance of the TCP protocol layer.

An example of a TCP option is "TCP timestamps" which is defined in Internet Engineering Task Force (IETF) Request For Comments (RFC) 1323. The TCP timestamps option is used to compute the round-trip time for a connection between a sender and a receiver. The TCP timestamps option may also be used to protect against wrapped sequences.

Figure 3:
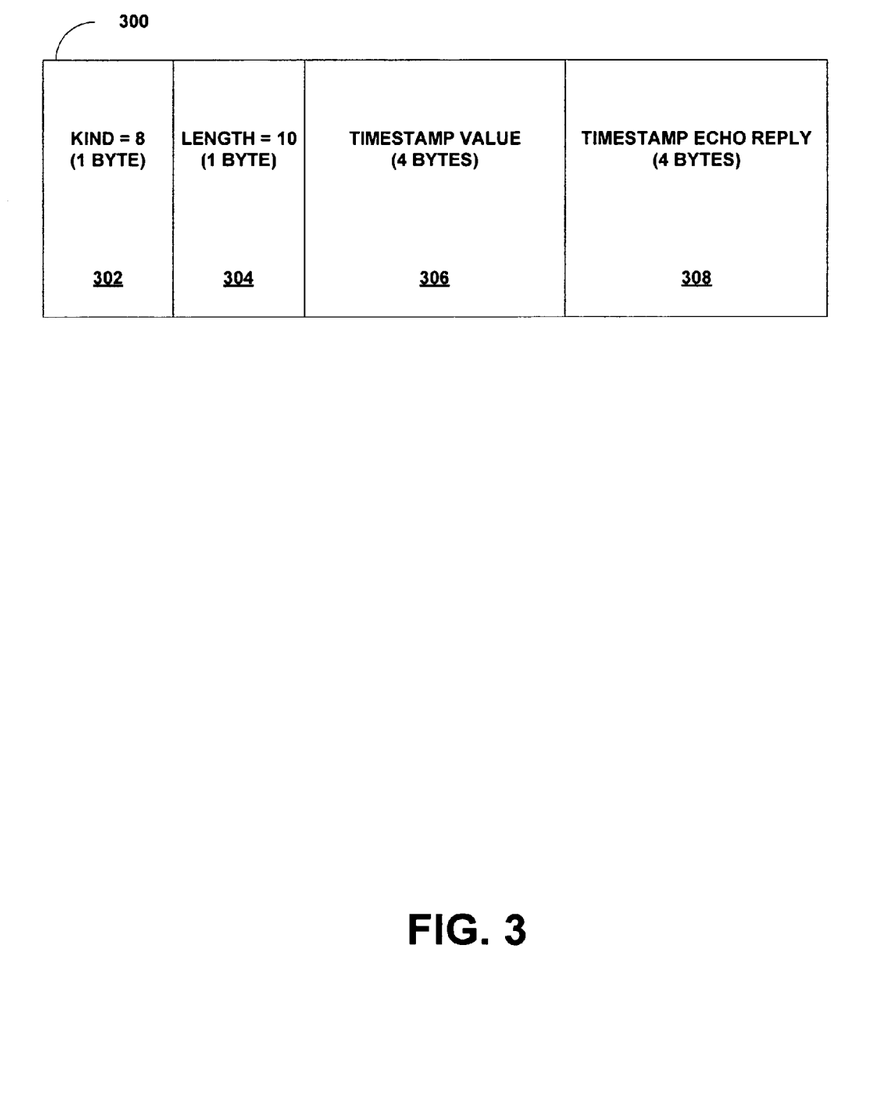
FIG. 3 is a block diagram of the TCP timestamps Option which can be used to communicate flow state between a sender and a receiver according to the principles of the present invention.

FIG. 3 is a block diagram of the TCP timestamps option 300 which can be used to communicate flow state between a sender and a receiver over a connection according to the principles of the present invention.

The TCP Timestamps option 300 includes a kind field 302, a length field 304, a time stamp (TS) value field 306 and a timestamp (TS) echo reply field 308. The kind field 302 stores the type of TCP Option. For example, in order to indicate that the TCP option is a TCP timestamps option, the kind field stores a value of '8'. The length field 304 stores the total number of bytes in the TCP Option. For example, for the TCP timestamps option 300, the length field 304 stores the value '10' indicating that the total number of bytes in the TCP Timestamps Option 300 is 10. The timestamp value field 306 stores the current value of the timestamp clock of the sender of the packet. The timestamp echo reply field 308 is valid if an ACK bit is set in the TCP header fields 202A (FIG. 2). If valid, the timestamp echo reply field 308 stores the same value that was last sent by the sender in the Timestamp value field 306 in the TCP timestamps option 300.

In an embodiment, the TCP Timestamps option 300 is used to communicate flow state between sender and receiver by using the timestamp value field 306 in the TCP timestamps option 300 to store "transmit state data". The TCP timestamps option 300 that stores the transmit state data will be referred to as a modified TCP timestamps option. As the modified TCP timestamps option flows through intermediate nodes in the network from one endpoint of the connection to the other endpoint of the connection, it is not modified or interpreted by any of the intermediate nodes. Thus, only the endpoints of the connection are aware that the TCP timestamps option has been modified to store transmit state data in the TS value 306 field instead of a timestamp value. Thus, this embodiment does not require any changes to the TCP timestamps option 360 defined by IETF Request For Comments (RFC) 1323 (http://tools.ietf.org/html/rfc1323).

In another embodiment, the TCP Timestamps option 300 is used to communicate flow state between sender and receiver. This is performed without impeding the standard use of the TCP Timestamps option 300. The TCP Timestamps option 300 is normally used to compute the round-trip time for a connection between a sender and a receiver. The timestamp option 300 is normally used to transfer a binary representation of the system clock.

In this embodiment, either the most significant bits or the least significant bits are overridden by the sender. The least significant bits may be overridden in cases that the error introduced is tolerable. When overriding the most significant bits the sender must restore the original value of the most significant bits before storing in memory for use by the networking stack. The value stored in the most significant bits however rarely changes and is typically the same for all of the connections, so storing it in the endpoint 100 (FIG. 1), for example, in the NIC 108 (FIG. 1) is efficient.

For example if the value stored in the TCP Timestamps option field 306T has 4 bytes, the sender sends 0x1230-0101 and the value to be echoed is '9, the stored value is overridden with 0x1230-0109. The other endpoint echoes what it received, that is, 0x1230-0109. The '9' is extracted from the echoed value and is replaced with '0' prior to passing it to the protocol stack. Thus, 0x1230-0100 is sent to the sender instead of the 0x1230-0101 value that was received. This can be performed in cases where the error introduced can be tolerated.

Other portions of the binary value stored in the TCP Timstamps option field 306 may rarely change. For example, most significant portion of a binary timestamp value rarely changes. In another embodiment, this portion of the binary value is overwritten with the "transmit state data". However, as this change introduces an error that is rarely acceptable, instead of replacing with an arbitrary value, '0' for example, the overridden value must be saved so that it can be restored. As this value rarely changes and is usually the same for all connections, only one value (or at most two) must be stored in order to restore the year value for all connections.

Thus, a portion of the binary value stored in the TCP Timestamps option field may be overwritten with the "transmit state data". The other endpoint receives the modified timestamp value with the overwritten "transmit state data" in it and echoes the modified timestamp value by storing the modified timestamp value in the timestamp (TS) echo reply field 308.

Figure 4A:
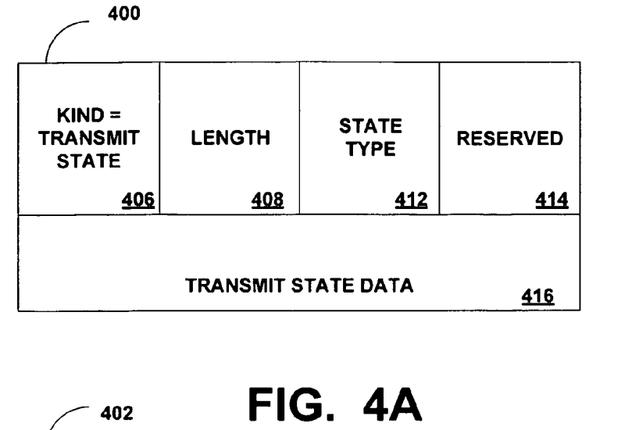
FIGS. 4A-4C illustrate embodiments of a TCP Flow State Option according to the principles of the present invention.
Figure 4B:
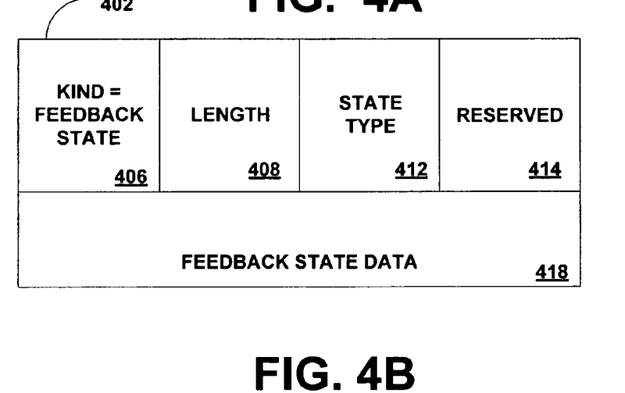

FIGS. 4A-4B illustrate an embodiment of a TCP Flow State Option 400, 402 according to the principles of the present invention. As discussed earlier, intermediate nodes, such as switches and routers between the endpoints of the TCP connection ignore unknown TCP options. Only the sender and receiver need to know how to handle the TCP Flow Sate Option 400, 402 included in the TCP header 202 (FIG. 2) of each TCP segment 200 (FIG. 2).

Referring to FIGS. 4A-4B, the TCP Flow State option 400, 402 is used to convey state (transmit or receive) information 416, 418 associated with a data traffic flow from one endpoint of the TCP connection to the other endpoint of the TCP connection. The receiver endpoint echoes the last version of the TCP Flow State Option 400 received from the transmitter endpoint by including the TCP Flow State Option 402 that includes feedback state data 418 in TCP Options 202B its transmitted packets.

In the embodiment shown in FIGS. 4A and 4B, there are separate TCP Flow State Options 400, 402 defined for the receive endpoint and the transmit endpoint of the TCP connection.

Referring to FIG. 4A, the transmit endpoint of the TCP connection sends a TCP Flow State option 400 that includes a kind field 406 with a stored value indicating that the TCP Flow State Option is for "transmit state". The TCP Flow State option 400 also includes a length field 408 to store the total number of bytes in the TCP Flow State option 400 for transmit state, a state type 412 field to store the type of information provided by state data and a transmit state data field 416. For example, the type of information that can be stored in the state type field 412 can be the core to use to process the packet or the index of the Remote Direct Memory Access (RDMA) queue pair.

Referring to FIG. 4B, the receive endpoint of the TCP connection sends a TCP Flow State option 402 that includes a kind field 406 with a stored value indicating that the TCP Flow State Option 402 is for "feedback state". The TCP Flow State option 402 also includes a length field 408 to store the total number of bytes in the TCP Flow State option for feedback state, a state type 412 field and a feedback state data field 416. The state type field 412 can store the type of information replicated by feedback state data, for example the core to use to process the packet or the index of the RDMA queue pair.

The transmit state data field 416 is a generic field that can store any information to be transmitted to the other endpoint of the connection. For example, the transmit state data field 416 can store an indication of the core processor that is associated with the socket for the TCP connection. For example, the state type field 412 can store an indication of the core processor that is assigned to handle the socket, that is, the "core affinity". In an embodiment with eight core processors, the indication stored can be a number that is assigned to a particular core processor (1-8). The feedback state data field 418 stores a copy of the data stored in the transmit state data field 416 that was received from the other endpoint in a TCP Flow State Option 400.

In order to avoid confusion and allow the TCP flow state option 400 to store different types of information, the state type 412 defines which information is stored in the transmit state data field 416 and the feedback state data field 418

Figure 4C:
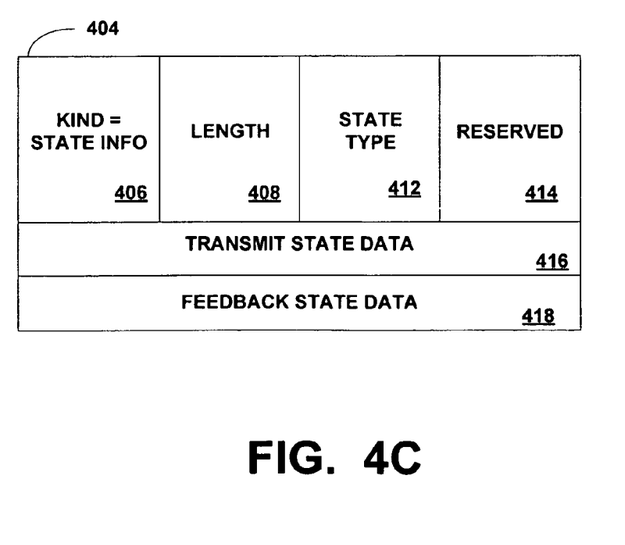

Referring to FIG. 4C, in another embodiment, both the transmit state data and the feedback state data are included in a single TCP Flow State Option 404 that is used to both transmit the "transmit state data" and to receive the "feedback state data". Both the receive endpoint and transmit endpoint of the TCP connection send a TCP Flow State option 404 that includes a kind field 406, a length field 408, a state type 412 field a transmit state data field 416 and a feedback state data field 418. The kind field 406 can store a value indicating that the TCP Flow State Option is for "state information". The length field can store the total number of bytes in the TCP Flow State option 404. The state type 412 field can store the type of information replicated by state data, for example the core to use to process the packet or the index of the RDMA queue pair.

In a state-full controller, for example, a Host Bus Adapter (HBA), a TCP Offload Engine (TOE) or a Remote Network Interface Controller (RNIC), a large context is stored for each data traffic flow in host memory (memory external to the NIC). In order to access the context for a particular data traffic flow, the NIC typically performs a hash based search in a lookup table in the NIC to find the location of the context in host memory. This hash based search requires translation tables in the NIC and multiple accesses to host memory or to another external memory.

In an embodiment, instead of storing flow context for a data traffic flow in the NIC 108 (FIG. 1), the flow context is stored in external memory (for example, 110 (FIG. 1)). With the flow context stored in external memory, instead of performing a hash based search to determine the location of the context stored in external memory, a pointer to the location of the context stored in external memory is sent to the other endpoint of the connection. The pointer to the location of the flow context in external memory is stored in the transmit state data field 416 of the TCP flow state option 400. The TCP flow state option 400 is sent in a TCP header of a TCP segment to the other endpoint. The other endpoint stores the pointer to the location of the flow context and echoes it in a feedback state data field 418 when sending a packet for the respective data traffic flow. Upon receiving the packet that includes the pointer to the location of the flow context stored in external memory, the context can be directly accessed in external memory, removing, any need for a complex context search mechanism.

Figure 5:
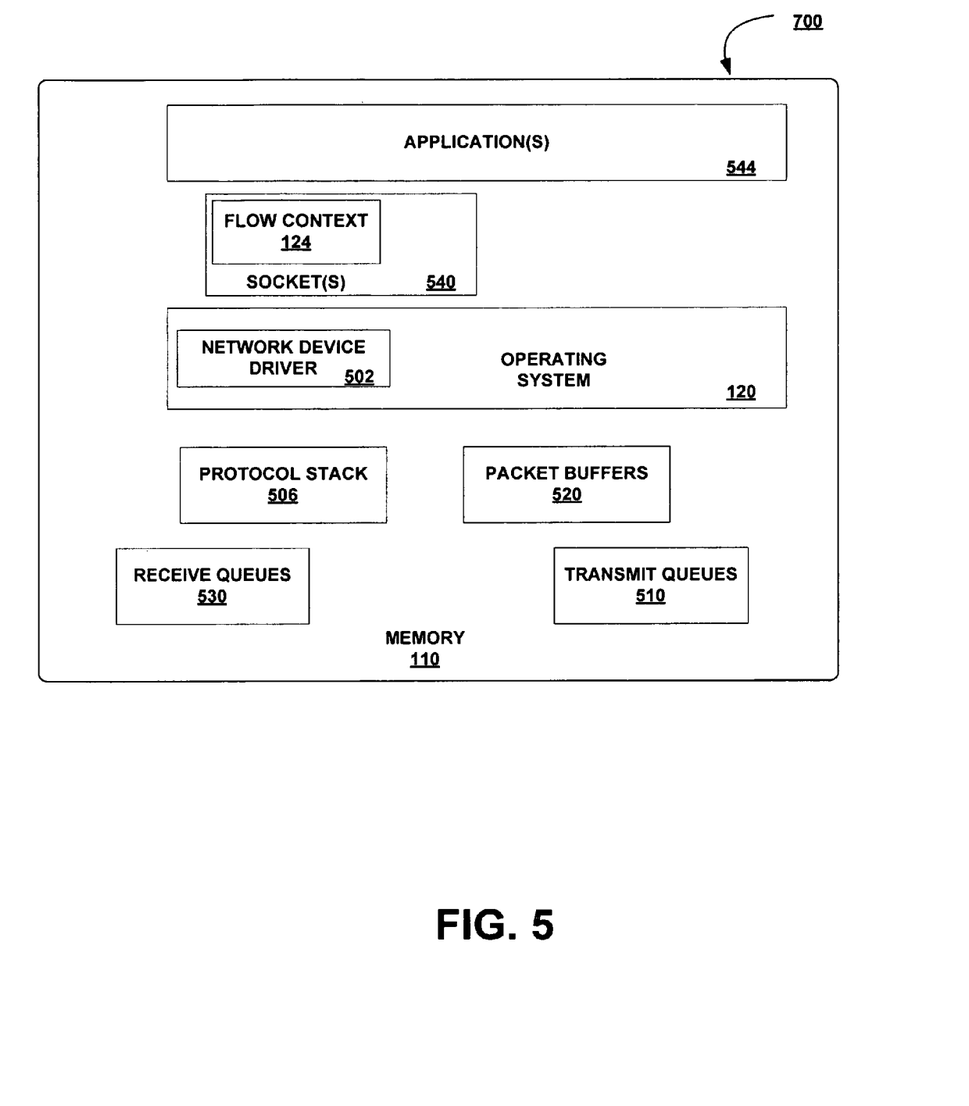
FIG. 5 is a block diagram illustrating an embodiment of elements in memory in the system shown in FIG. 1.

FIG. 5 is a block diagram illustrating an embodiment of modules in memory in the system shown in FIG. 1.

The memory 110 may store applications 302 such as a web browser, an email serving application, a file serving application, or a database application that use data stored in the payload of packets transferred over a network.

The memory may also store an operating system 120 that includes a device driver 520. The device driver 520 includes network adapter specific functions to communicate with the NIC 108. For example, operating system 504 may be MICROSOFT WINDOWS, LINUX, or UNIX or any operating system. In one embodiment, the operating system 504 may be executed by any of the plurality of core processors 122.

Data packets received by the NIC 108 may be stored in packet buffers 520 in the memory 110. The protocol stack 506 also stored in memory 110 may include a transport protocol layer and a network layer. The protocol stack 506 executes one or more programs to process packets. An example of a protocol stack is a TCP/IP (Transport Control Protocol/Internet Protocol) protocol stack comprising one or more programs for handling (e.g., processing or generating) packets to transmit and/or receive over a network.

The protocol stack 506 processes packets received by the NIC 108 that are stored in the packet buffers 520. The network layer handles network communication and provides received TCP/IP packets to the transport protocol layer. The transport protocol layer interfaces with the network device driver 520 or operating system 510 or an application 514, and performs additional transport protocol layer operations, such as processing the content of headers included in the packets received at the NIC 108. The transport protocol layer can unpack the payload from the received TCP/IP packet and transfer the data to the device driver 508, an application 502 or the operating system 120.

In the embodiment shown, the flow context 124 in the socket 540 includes information for a connection to a remote computer over the network 118. An application 544 uses the information in the flow context 124 to identify the connection and to communicate with a remote system. The flow context 124 may indicate the local port or socket 540 that will be used to communicate with a remote system, a local network (IP) address of the system in which an application executes, how much data has been sent and received by the application, and the remote port and network address with which the application 544 communicates.

The TCP option described in conjunction with FIGS. 3 and 4A-4C can be added to a TCP header either by the NIC 108, or by software, for example, by the network device driver 502 or by the socket 540. The NIC 108 or network device driver 502 in each endpoint can use the feedback state data included feedback state data field 418 in the TCP option to process the packet. The socket 540 in each end controls the use of the feedback state data.

Packet buffers 520 may include multiple buffers and each buffer may store at least one packet received from the network 118. Packet buffers 520 may store packets received by the NIC 108 that are queued for processing at least by device driver 508, operating system 120, and/or applications 502.

Data from different sockets 540 may be routed to different transmit queues 510 according to some properties of the traffic, for example the core processor 122 on which the application executes. The information identifying the transmit queue to be used may be embedded in the Transmit State Data.

As the receiver of the packet echoes the received Transmit State Data in the Feedback State Data, the data received for different sockets 540 may similarly be queued by the NIC 108 through receive queues 530 according to some parameters. For example, in one embodiment, the data can be queued according to the feedback state data received in the packet.

Figure 6:
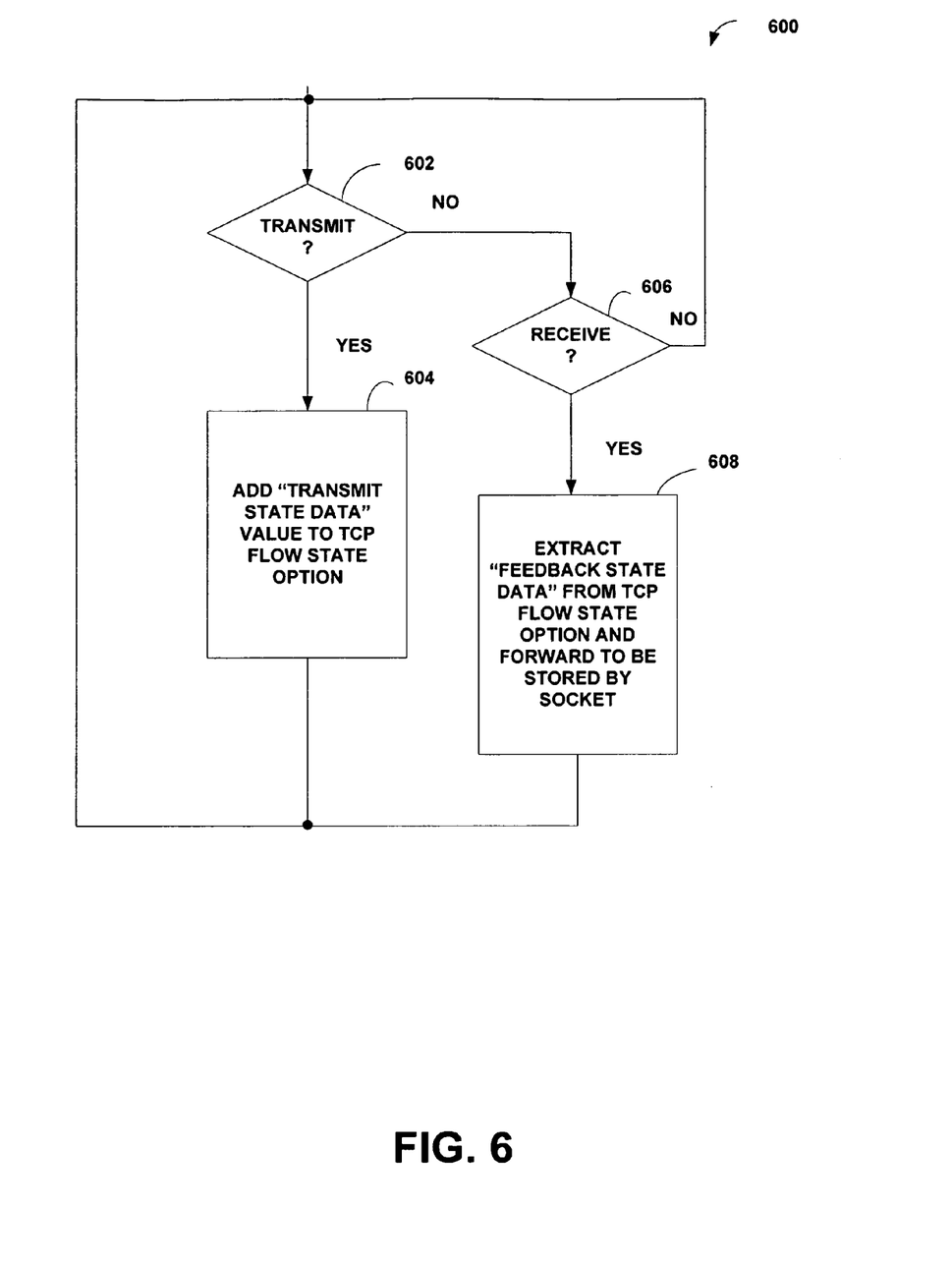
FIG. 6 is a flowgraph illustrating operations performed in a sending endpoint.

FIG. 6 is a flowgraph illustrating operations performed by a CPU 101 in a sending endpoint 600. FIG. 6 will be discussed in conjunction with the TCP flow state option 400, 402 shown in FIGS. 4A-4B and FIG. 5.

At block 602, the sending endpoint of the TCP connection determines if there is a request to transmit a packet. If so, processing continues with block 604. If not, processing continues with block 606.

At block 604, the sending endpoint adds "transmit state data" to the transmit state data field 416 in the TCP flow state option 400 associated with data traffic flow. For example, the "transmit state data" can be a pointer to where the context associated with the data traffic flow is stored in the flow context buffer 124 in memory 110. The "transmit state data" can be added to the transmit state data field 416 by the CPU 101 or the NIC 108. Processing continues with block 602.

At block 606, the sending endpoint determines if a packet has been received. If so, processing continues with block 608. If not, processing continues with block 602.

At block 608, the sending endpoint extracts the "feedback state data" value stored in the feedback state data field 418 in the TCP flow state option 402 from the received packet. The extracted feedback state data value can be used to process the packet, for example to determine to which CPU to forward the packet. The packet is forwarded to the process (thread) or application to process the received packet. In an embodiment in which a pointer to the flow context 124 that is stored in memory 110 is stored in the TCP flow state option 402, the pointer stored in the "feedback state data" field 418 is extracted and forwarded. Processing continues with block 602 to continue to process both packets to be transmitted and received packets for the connection.

Figure 7:
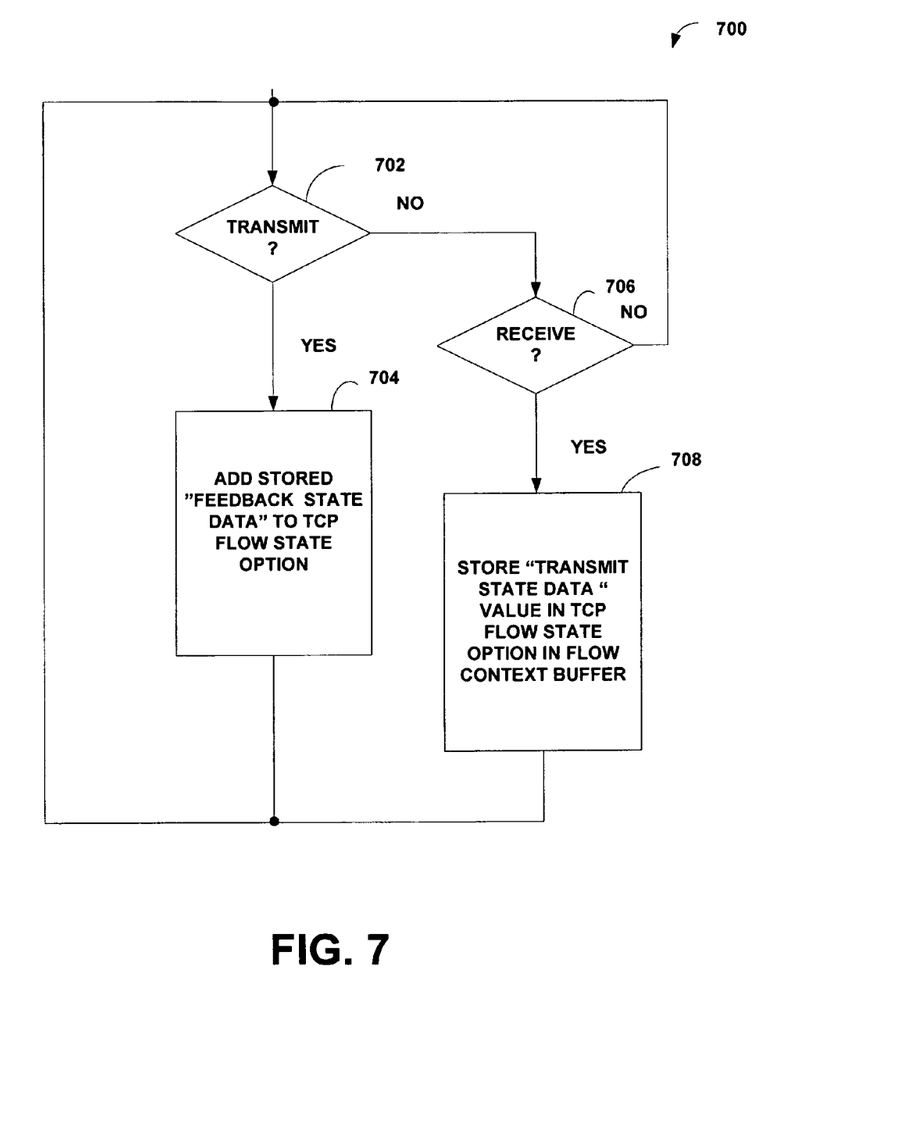
FIG. 7 is a flowgraph illustrating operations performed in a receiving endpoint.

FIG. 7 is a flowgraph illustrating operations performed by a CPU 101 in a receiving endpoint. In an embodiment, the CPU 101 performs the operations using socket 540.

At block 702, the receiving endpoint determines if there is a request to transmit a packet from the application 744. If so, processing continues with block 704. If not, processing continues with block 706.

At block 704, the receiving endpoint adds the stored "feedback state data" value to the feedback state data field 418 in the TCP flow state option 402 to identify the context associated with the traffic data flow associated with the packet stored in memory in the sending endpoint. Processing continues with block 702.

At block 706, the receiving endpoint determines if a packet has been received from the sending endpoint. If so, processing continues with block 708. If not, processing continues with block 702.

At block 708, the receiving endpoint extracts "the transmit state data" value from the transmit state data field 416 of the TCP flow state option 400 in the received packet. The receiving endpoint stores the extracted transmit state data value in the flow context buffer 124. Processing continues with block 702.

In an embodiment, conveying the data traffic flow state to the other endpoint of the connection using the TCP Flow State Options 400, 402, 404 discussed in conjunction with FIGS. 4A-4C eliminates the need to use a hash based lookup for context in the stack and also reduces the latency of the receive processing. In an embodiment, for state-full offloads, conveying the per data traffic flow improves the efficiency of retrieval of context and also reduces the size of lookup tables in the NIC. Conveying the per data traffic flow between endpoints removes the limit on the number of data traffic flows that can be supported. This allows a greater number of connections to be supported.

In another embodiment, the transmit state data field 416 can be used to store data traffic flow state for other transmission protocols. For example, in a system having a plurality of core processors Application Targeted Routing (ATR) keeps track of which application each of the core processors 122 is executing. The sender endpoint learns from the other endpoint on which core processor 122 the application is executing. This information is stored for use when the sending endpoint needs to determine to which core processor's queue to send a received packet for processing. In this embodiment, the NIC no longer needs to provide memory to store this information.

In yet another embodiment, the transmit state data field 416 can be used to store information associated with the index of an IPSec Security Association (SA) in a table. Security Associations are keys used to encrypt and decrypt the payload stored in a data packet. In an embodiment, SAs can be stored in the host memory (memory external to the NIC) instead of storing all SAs in on-die memory in a NIC thereby reducing the amount of on-die memory required in the NIC.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional. ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
    first logic, at one endpoint of a connection, to receive a packet from a network, the packet including a state value associated with a data traffic flow for the connection, the first logic to store the state value in a memory external to a network interface controller; and
    second logic, at the one endpoint of the connection, to retrieve the stored state value and to add the retrieved stored state value to another packet to be transmitted to another endpoint of the connection:
    wherein the state value is core affinity for the data traffic flow at the another endpoint of the connection.

2. The apparatus of claim 1, wherein the connection is a TCP connection.

3. The apparatus of claim 1, wherein the state value is stored in a TCP option in a TCP header in the packet.

4. The apparatus of claim 1, wherein the state value is a pointer to the location in the external memory where a state associated with the data traffic flow is stored.

5. The apparatus of claim 1, wherein the state value is stored in a TCP timestamps option in a TCP header in the packet.

6. The apparatus of claim 1, wherein the state value is an index of a Remote Direct Memory Access (RDMA) queue pair.

7. A method comprising:
    receiving, at one endpoint of a connection, a packet from a network, the packet including a state value associated with a data traffic flow for the connection;
    storing the state value in a memory external to a network interface controller;
    retrieving the stored state value from the external memory; and adding the retrieved stored state value to another packet to be transmitted to another endpoint of the connection;
    wherein the state value is core affinity for the data traffic flow at the another endpoint of the connection.

8. The method of claim 7, wherein the connection is a TCP connection.

9. The method of claim 7, wherein the state value is stored in a TCP option in the packet.

10. The method of claim 7, wherein the state value is a pointer to the location of flow state associated with the data traffic flow stored in the external memory.

11. The method of claim 7, wherein the state value is stored in a TCP timestamps option in the packet.

12. The method of claim 7, wherein the state value is an index of a Remote Direct Memory Access (RDMA) queue pair.

13. A computer readable storage medium having instructions stored thereon, wherein the instructions when accessed, results in performing:
    receiving, at one endpoint of a connection, a packet from a network, the packet including a flow state value associated with a data traffic flow for the connection;
    storing the flow state value in a memory external to a network interface controller;
    retrieving the stored flow state value from the external memory; and adding the retrieved stored flow state value to another packet to be transmitted to another endpoint of the connection;
    wherein the state value is core affinity for the data traffic flow at the another endpoint of the connection.

14. The medium of claim 13, wherein the state value is stored in a TCP timestamps option in the packet.

15. A system comprising:
a disk drive to store data stored in packets received over a network;
first logic, at one endpoint of a connection, to receive a packet from the network, the packet including a flow state value associated with a data traffic flow for the connection, the first logic to store the flow state value in a memory external to a network interface controller; and
second logic, at the one endpoint of the connection, to retrieve the stored flow state value and to add the retrieved stored flow state value to another packet to be transmitted to another endpoint of the connection;
wherein the state value is core affinity for the data traffic flow at the another endpoint of the connection.

16. The method of claim 15, wherein the state value is stored in a TCP timestamps option in the packet.

* * * * *